Sept. 6, 1966 — H. M. PHILOFSKY — 3,271,600
DYNAMOELECTRIC MACHINE
Filed June 22, 1964 — 2 Sheets-Sheet 1
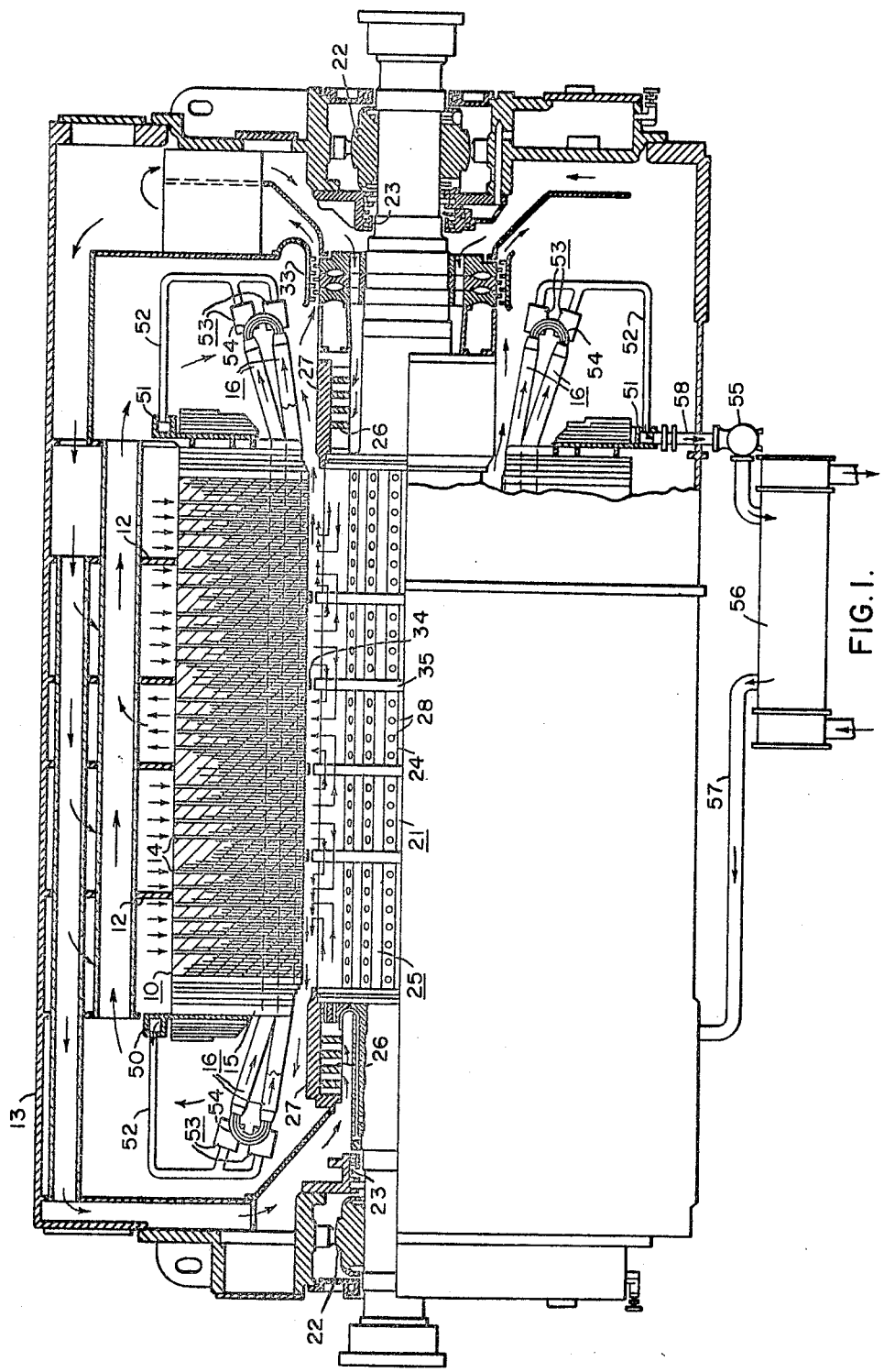
FIG. I.

Sept. 6, 1966          H. M. PHILOFSKY          3,271,600
DYNAMOELECTRIC MACHINE
Filed June 22, 1964          2 Sheets-Sheet 2
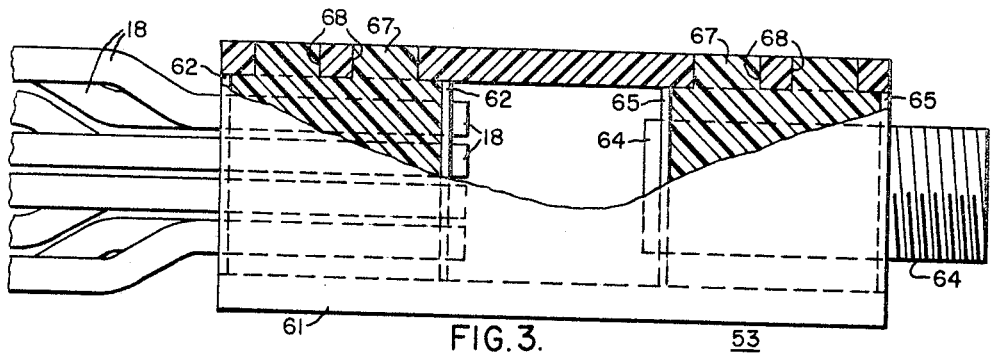
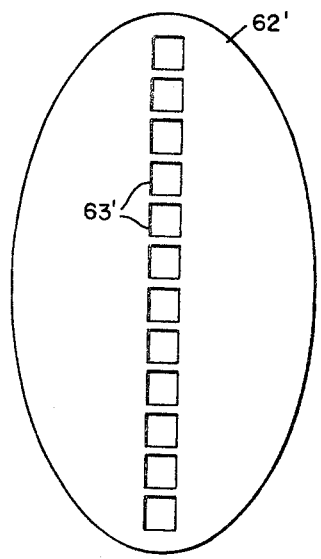
FIG. 5.
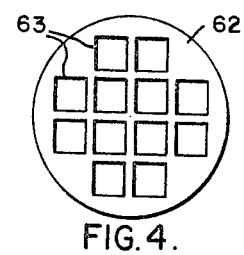
FIG. 4.
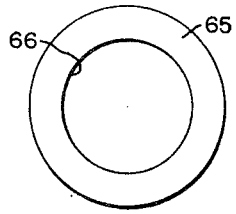
FIG. 6.
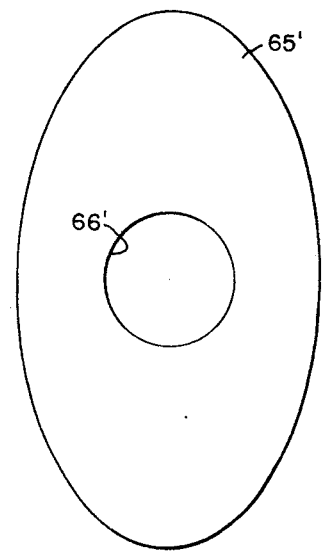
FIG. 7.
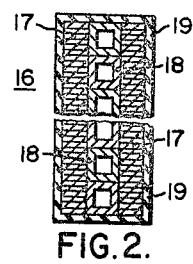
FIG. 2.
WITNESSES:
Bernard R. Gieguex
Leon M. Garman
INVENTOR
Harold M. Philofsky
BY T. P. Lyle
ATTORNEY

United States Patent Office 3,271,600
Patented Sept. 6, 1966

3,271,600
DYNAMOELECTRIC MACHINE
Harold M. Philofsky, Pittsburgh, Pa., assignor to Westinghouse Electric Corporation, East Pittsburgh, Pa., a corporation of Pennsylvania
Filed June 22, 1964, Ser. No. 376,914
5 Claims. (Cl. 310—55)

This invention relates, generally, to dynamoelectric machines and, more particularly, to ventilation systems for turbine generators of relatively large size.

Large turbine generators are usually of the inner cooled, or direct cooled, construction in which a coolant fluid is circulated through duct means in the stator and rotor slots in direct thermal relation with the current-carrying conductors inside the ground insulation. This type of construction provides a very effective cooling system and has made it possible to greatly increase the maximum ratings obtainable in large generators without exceeding the permissible limits of physical size.

These machines have usually been cooled by a coolant gas, hydrogen being commonly used, which fills the gastight housing and is circulated by a blower on the rotor shaft through the ducts of the stator and rotor windings and through radial ducts in the stator core. As the ratings of these large generators have increased, however, it has become desirable to further improve the cooling of the stator windings, and for this purpose it has been proposed to use more effective coolant fluids in the ducts of the stator winding. Such coolants may for example be a liquid such as water, or a gas at high pressure such as hydrogen at a pressure of several hundred pounds per square inch. The use of such coolant fluids requires that the coolant be circulated through the stator coils in a closure recirculating system separate and sealed from the coolant gas in the housing which cools the stator core and rotor winding.

One of the problems encountered in providing a closed system for circulating the coolant through the stator coils of a turbine generator is the provision of a satisfactory connection from the external part of the cooling system to the vent tubes or ducts located within each stator coil. One possible method would be to connect to each individual vent tube in each coil. From a manufacturing standpoint, however, this would be prohibitive in view of the large number of coils and tubes in each machine, which would require over 1500 connections for a typical machine. An alternative method is to place a metal fitting or connector over all the vent tubes in parallel at the ends of each stator coil. This has the disadvantage that the metal vent tubes are shorted together, thereby preventing the making of group transpositions and resulting in circulating currents and eddy current losses in the tubes.

The principal object of the present invention is to provide a dynamoelectric machine of the inner cooled type having a closed system for circulating coolant fluid through cooling ducts in the stator coils and having simple and easily produced insulating connectors or fittings for connecting the cooling ducts into the coolant system.

Another object of the invention is to connect the metal cooling ducts in the stator coils of a dynamoelectric machine into the cooling system of the machine in a manner which prevents circulating currents and minimizes eddy current losses in the ducts.

A further object of the invention is to provide for connecting a plurality of metal vent ducts in a stator coil to a single fitting in such a manner that the end of each duct is separated and insulated from the other ducts.

Other objects of the inventoin will be explained fully hereinafter or will be apparent to those skilled in the art.

In accordance with the invention, the ends of the cooling or vent ducts of each stator coil of a large generator are inserted into one end of a plastic pipe which forms an insulating connector or fitting for connecting the vent ducts into the cooling system. The ends of the ducts are maintained in separated relation by two plastic templates disposed inside the plastic pipe in spaced relation. A pipe fitting for connection to the cooling system is supported inside the other end of the pipe by two similar spaced templates. The plastic pipe and the two vent duct templates form the outer shell of a mold which becomes a permanent part of the connector. Likewise, the plastic pipe and the pipe fitting templates form a similar mold. These molds are filled with a suitable resin which upon curing pots the entire assembly into a rigid insulating structure.

For a better understanding of the nature and objects of the invention, reference may be had to the following detailed description of a preferred embodiment, taken in conjunction with the accompanying drawings, in which:

FIGURE 1 is a view, partly in longitudinal section and partly in elevation, of a generator embodying principal features of the invention;

FIG. 2 is an enlarged cross-sectional view of one of the stator winding coils of the generator;

FIG. 3 is a view, partly in longitudinal section and partly in elevation, of a connector constructed in accordance with the invention;

FIG. 4 is a view, in elevation, of a template utilized for supporting the vent tubes in the connector;

FIG. 5 is a view, in elevation, of another template which may be utilized in place of the template shown in FIG. 4;

FIG. 6 is a view, in elevation, of a template utilized with the template shown in FIG. 4 for supporting the pipe fitting in the connector; and FIG. 7 is a view, in elevation, of another template which may be utilized with the one shown in FIG. 5 for supporting the pipe fitting in the connector.

Referring to the drawings, and particularly to FIGURE 1, the generator construction shown for the purpose of illustration is generally similar to that shown in a patent to R. A. Bandry, No. 3,110,827, issued November 12, 1963. However, it will be understood that the present invention may be utilized with any dynamoelectric machine having a closed cooling system for the stator coils of the machine.

As shown, the generator has a stator core 10 supported by frame rings 12 in a substantially gas-tight outer housing 13. The stator core 10 is of the usual laminated type having a generally cylindrical bore therethrough. The core 10 is built up of laminations arranged in spaced stacks to provide radial vent ducts 14 between them and the laminations of the core are clamped between suitable end plates in the usual manner.

The stator core 10 is provided with longitudinal slots 15 in its inner periphery for the reception of a stator winding which may be of any suitable type and which may consist of a plurality of half coils 16 connected at their ends to form the winding. The stator winding is of the inner-cooled construction and, as shown in FIG. 2, each half coil 16 comprises a plurality of conductor strands 17 which are lightly insulated and transposed in the usual manner, and which are separated by a stack of ducts 18, of high resistance metal, which are lightly insulated from each other and from the conductor strands 17. The ducts 18 extend longitudinally from one end to the other of the half coil 16 for circulation of a coolant fluid in close thermal relation to the conductor strands 17. The half coil 16 is enclosed in a heavy sheath of insulation 19 to provide the necessary high voltage insulation to ground. Two half coils are placed in each slot 15 of the stator core and the slots are closed by suitable wedges in the usual manner.

A rotor 21 is disposed in the bore of the stator core 10 and separated from the stator by an annular air gap. The rotor 21 is supported in bearings 22 of any suitable type mounted in the ends of the housing 13, and gland seals 23 are provided to prevent leakage of gas from the housing along the rotor shaft. The rotor 21 is provided with longitudinal slots 24 in its periphery for the reception of a field winding 25. The conductors of the winding 25 extend longitudinally of the rotor and have circumferentially extending end turn portions 26 which are supported against centrifugal forces by retaining rings 27 of the usual construction. The rotor winding 25 may be of the type described in the above-mentioned patent, comprising a plurality of insulated turns each of which consists of two generally channel-shaped conductors placed in face-to-face relation to form a longitudinal duct extending from end to end of the rotor through the center of each turn of the winding. Radial passages 28 are provided in the rotor conductors to connect the longitudinal ducts to the air gap to permit the coolant gas in the housing to flow through the ducts.

The housing 13 of the machine is made as nearly gas-tight as possible, and is sealed at the points where the rotor shaft passes through it by the gland seals 23. The housing is filled with a suitable coolant gas, preferably hydrogen, which is used in the illustrated embodiment for cooling the rotor and the stator core. A blower 33 is mounted on the rotor shaft adjacent one end of the machine for circulating the gas therethrough. Any suitable type of blower may be utilized and a multi-stage blower of the axial flow type is shown in the drawing for the purpose of illustration. The gas in the machine is maintained at a suitable static pressure which may, for example, be from 30 to 75 pounds per square inch above atmospheric pressure, although lower or higher gas pressure may be utilized, depending on the desired rating of the machine. The blower 33 develops a sufficient differential pressure to maintain the desired circulation of gas within the housing and through the ducts in the rotor and the stator core.

The gas in the housing may be circulated in any desired manner by the blower 33 to flow through the radial ducts 14 of the stator core and through the ducts of the rotor winding to cool the stator core and the rotor. In the particular machine shown in the drawing, the air gap is divided transversely into a plurality of annular zones by means of baffles 34 on the stator core and baffles 35 on the rotor, and adjacent zones are maintained at different gas pressures to cause the gas to flow from high pressure zones to adjacent low pressure zones through the ducts of the rotor winding. Suitable baffles and ducts are provided in the housing to cause the gas to flow in the desired manner, indicated by arrows in FIG. 1. This method of cooling the rotor and the means by which the desired flow of gas is obtained are fully described in the above-mentioned Baudry Patent No. 3,110,827 to which reference is made for a more complete description. The means for cooling the rotor and the stator core will not be further described herein since they are not a part of the present invention, and the stator winding cooling system may be used in any machine having any desired cooling system for the rotor.

In accordance with the present invention, the stator winding is cooled by a closed recirculating system for circulating coolant fluid through the ducts 18 of the stator coils. As shown in FIGURE 1, such a stator cooling system may include an intake manifold 50 at one end of the stator core 10 and a discharge manifold 51 at the opposite end. These manifolds may be annular passages extending circumferentially around the core and mounted at the ends of the core in any suitable manner. The intake manifold 50 is connected by a plurality of insulating tubes 52 to the end of each half coil 16 of the winding, the tubes 52 being connected by suitable connectors 53 to the ducts 18 of the coil. At the opposite end, similar connectors 53 connect the ducts 18 to insulating pipes 52 which are connected to the discharge manifold 51. The ducts 18 extend out of the coils at each end, and the end turn portions of the conductor strands 17 of each half coil are connected to another half coil in the usual manner, as indicated at 54.

The coolant for the stator winding is circulated by means of an external pump or compressor 55, depending upon whether a liquid or a gas is utilized, which circulates the coolant discharged from the machine through a cooler 56, of any suitable type, and through an entrance pipe 57 which passes through the housing 13 and is connected to the intake manifold 50. The coolant discharged at the opposite end of the machine flows from the discharge manifold 51 to a discharge pipe 58 which passes through the housing 13 to the pump or compressor 55.

In this way a closed recirculating system is provided which is entirely separate from the cooling system for the rotor and the stator core, so that more effective cooling of the stator winding can be obtained. The coolant for the stator winding may be a suitable liquid, such as water, or other suitable coolant fluids may be used. Thus, hydrogen at a high pressure of the order of several hundred pounds per square inch may be circulated through the stator winding. Any desired type of closed system may be utilized for circulating the coolant fluid.

Since it is desirable to maintain a relatively high pressure in the closed cooling system for the stator coils, it is necessary that the connectors 53 for connecting the ends of the cooling ducts 18 to the pipes 52 of the cooling system be capable of withstanding a relatively high pressure. Furthermore, in order to avoid short-circuiting the metal vent tubes to each other and to minimize eddy current losses, the connector must be composed of an insulating material and must maintain the ends of the ducts in separated relation.

As shown most clearly in FIG. 3, the connector 53 comprises a hollow insulating body portion which may be a piece of plastic pipe 61 and which may be either circular or oval in cross section. The cooling ducts 18 are positioned in one end of the pipe 61 by means of two templates 62 of a suitable plastic laminate which are disposed inside the pipe in spaced relation. If a circular pipe and circular templates are utilized, a plurality of rectangular holes 63 in the template 62 are arranged in the manner shown in FIG. 4. In this case, the ends of the stack of cooling ducts 18 are gradually bent in the manner shown in FIG. 3 to fit into the rectangular holes 63 in the templates 62.

If an oval shaped pipe 61 is utilized, oval shaped templates 62' are also utilized, and a plurality of rectangular openings 63' are provided in the template in a vertical line. The holes 63' are slightly separated from each other. In this case, the ventilating tubes or ducts 18 are kept in the same arrangement as within the coil 16, but they are maintained in separated relation by the spacing of the holes 63' in the template 62'. The templates fit snugly into the inside of the pipe 61.

As shown in FIG. 3, a pipe fitting 64 of any suitable type is supported in the other end of the pipe 61 by means of two spaced templates 65 each of which has a hole 66 therethrough as shown in FIG. 6. If a circular pipe 61 is utilized, the template 65 is circular in shape as shown in FIG. 6. If an oval pipe 61 is utilized, an oval template 65' having a circular opening 66' therethrough is utilized to support the pipe fitting 64. The templates 65 fit snugly inside the pipe 61 and are disposed in spaced relation as shown in FIG. 3.

The plastic pipe 61 and the two pairs of templates form the shell of a mold which becomes a permanent part of the connector. As shown in FIG. 3, the pipe 61 and the templates 62 form one compartment containing the ends of the cooling ducts 18. The pipe 61 and the templates 65 form another compartment containing the pipe fitting 64. The inner ends of the ducts 18 and the pipe fitting 64 extend beyond the inner templates 62 and 65. After assembly of the connector on the ducts 18 with the templates and fitting 64 in place, a suitable resin 67 is poured through holes 68 in the top of the pipe 61, thereby potting the entire assembly in place, and forming a strong, rigid insulating connector which insulates the ducts 18 from each other. The fittings 64 can then be connected to the pipes 52 to complete the closed coolant system.

The plastic pipe 61 may be made of glass epoxy, glass melamine or Dacron epoxy. It may be of a laminated structure and of sufficient thickness to be suitable for the operating conditions. The plastic laminate templates may be of a similar material from 1/32 of an inch to 1/16 of an inch in thickness. The templates may be manufactured by a punch press operation out of suitable sheet material.

The potting resin may be one of many polyester or epoxy formulations commercially available. The resin may be of a room temperature curing type, but better results have been obtained with a resin of a high temperature curing type.

From the foregoing description, it is apparent that the invention provides an insulating connector which is particularly suitable for connecting the cooling or vent tubes of a stator coil of an inner cooled dynamoelectric machine to the piping of a closed cooling system for the stator coils. The connector provides for maintaining the ends of the cooling tubes in separated relation and does not interfere with the normal electrical connections of the coils or with making group transpositions. The connector is relatively simple in construction and may be manufactured at a relatively low cost, and is capable of withstanding high pressures without leakage.

Since numerous changes may be made in the above-described structure and different embodiments of the invention may be made without departing from the spirit and scope thereof, it is intended that all subject matter contained in the foregoing description or shown in the accompanying drawings shall be interpreted as illustrative and not in a limiting sense.

I claim as my invention:

1. In a dynamoelectric machine having an annular stator core with a plurality of longitudinal slots therein, a plurality of stator winding members disposed in said slots, each of said winding members including winding conductors and a plurality of duct members disposed in good thermal relation with the winding conductors and insulated from the winding conductors and each other within the slot, coolant supply means for circulating a coolant fluid through said duct members, insulating connector means at each end of each winding member for connecting the duct members to the coolant supply means, said connector means including a mass of insulating material in which the ends of the duct members are embedded to hold the duct members in separated relation and to insulate the duct members from each other, and means independent of the connector means for effecting electrical connection between the winding conductors of different winding members.

2. In a dynamoelectric machine having an annular stator core with a plurality of longitudinal slots therein, a plurality of stator winding members disposed in said slots, each of said winding members including winding conductors and a plurality of duct members disposed in good thermal relation with the winding conductors and insulated from the winding conductors and each other within the slot, a coolant system for circulating a coolant fluid through said duct members, said coolant system including piping means at each end of the stator core for connection to each winding member, insulating connector means at each end of each winding member for connecting the duct members thereof to said piping means, said connector means including a mass of insulating material in which the ends of the duct members are embedded to hold the duct members in separated relation and to insulate the duct members from each other, and means independent of the connector means for effecting electrical connection between the winding conductors of different winding members.

3. In a dynamoelectric machine having an annular stator core with a plurality of longitudinal slots therein, a plurality of stator winding members disposed in said slots, each of said winding members including winding conductors and a plurality of duct members disposed in good thermal relation with the winding conductors and insulated from the winding conductors and each other within the slot, a coolant system for circulating a coolant fluid through said duct members, said coolant system including piping means at each end of the stator core for connection to each winding member, insulating connector means at each end of each winding member for connecting the duct members thereof to said piping means, each of said connector means having a hollow insulating body portion, the ends of the duct members extending into one end of the body portion, a mass of insulating material closing said end of the body portion and holding the ends of the duct members in separated relation to each other, a pipe fitting member extending into the other end of the body portion, and a mass of insulating material closing said other end and holding said pipe fitting member in place therein.

4. In a dynamoelectric machine having an annular stator core with a plurality of longitudinal slots therein, a plurality of stator winding members disposed in said slots, each of said winding members including winding conductors and a plurality of duct members disposed in good thermal relation with the winding conductors and insulated from the winding conductors and each other within the slot, a coolant system for circulating a coolant fluid through said duct members, said coolant system including piping means at each end of the stator core for connection to each winding member, insulating connector means at each end of each winding member for connecting the duct members thereof to said piping means, each of said connector means having a hollow insulating body portion, two spaced insulating template members disposed in one end of the body portion, said template members having aligned openings therein and the ends of the duct members extending through said openings, the openings being arranged to hold the duct members separated and insulated from each other, a mass of insulating material filling the space between the template members to close and seal said end of the body portion and hold the duct members in place, a pipe fitting member extending into the other end of the body portion, and a mass of insulating material closing said other end and holding said pipe fitting member in place therein.

5. In a dynamoelectric machine having an annular stator core with a plurality of longitudinal slots therein, a plurality of stator winding members disposed in said slots, each of said winding members including winding conductors and a plurality of duct members disposed in good thermal relation with the winding conductors and insulated from the winding conductors and each other within the slot, a coolant system for circulating a coolant fluid through said duct members, said coolant system including piping means at each end of the stator core for connection to each winding member, insulating connector means at each end of each winding member for connecting the duct members thereof to said piping means, each of said connector means having a hollow insulating body portion, two spaced insulating template members disposed in one end of the body portion, said template members having aligned openings therein and the ends of the duct members extending through said openings, the openings being arranged to hold the duct members separated and insulated from each other, a mass of insulating material filling the space between the template members to close and seal said end of the body portion and hold the duct members in place, two spaced template members disposed in the other end of the body portion, a pipe fitting member extending into said other end and supported in aligned openings in the last-mentioned template members, and a mass of insulating material filling the space between the last-mentioned template members to close and seal said other end.

References Cited by the Examiner
UNITED STATES PATENTS 3,110,827  11/1963  Baudry _____ 310—55

References Cited by the Applicant
UNITED STATES PATENTS 2,695,368  11/1954  Kilbourne.
2,873,393  2/1959  Baudry.

MILTON O. HIRSHFIELD, *Primary Examiner.*

L. L. SMITH, *Assistant Examiner.*